United States Patent [19]

Wick et al.

[11] 4,017,171

[45] Apr. 12, 1977

[54] APPARATUS FOR MAKING COPIES OF MULTI-COLORED ORIGINALS

[75] Inventors: Richard Wick, Munich; Friedrich Bestenreiner, Grunwald; Dieter Giglberger, Unterhaching; Günter Wetzel, Haar; Walter Schott, Zorndeding, all of Germany; Jozef Leonard V. Engeland, St. Katelijne-Waver; Willy Gommaire Verlinden, Edegem, both of Belgium

[73] Assignee: AGFA-Gevaert, A.G., Leverkusen, Germany

[22] Filed: July 17, 1975

[21] Appl. No.: 596,737

[30] Foreign Application Priority Data

July 25, 1974 Germany .......................... 2435851

[52] U.S. Cl. ........................................ 355/4; 355/72

[51] Int. Cl.[2] .................. G03B 27/58; G03G 15/01

[58] Field of Search .............. 355/4, 53, 72, 73, 75, 355/76; 198/218, 110

[56] References Cited

UNITED STATES PATENTS

| | | | |
|---|---|---|---|
| 3,146,690 | 9/1964 | Hoffman | 355/73 |
| 3,519,343 | 7/1970 | McNair et al. | 355/4 |
| 3,574,456 | 4/1971 | Grace | 355/4 |
| 3,645,375 | 2/1972 | Gelzer | 198/19 |
| 3,694,069 | 9/1972 | Tamaji et al. | 355/4 |
| 3,778,151 | 12/1973 | Zimmet | 355/53 |
| 3,810,693 | 5/1974 | Matsumoto et al. | 355/72 |

*Primary Examiner*—Donald A. Griffin
*Attorney, Agent, or Firm*—Michael J. Striker

[57] ABSTRACT

A color copying apparatus wherein a copy carrier sheet is attracted by the suction chamber of a carriage which is reciprocable along a horizontal path past an exposure station and along a battery of aligned developing units. After each exposure with a different filter, the sheet is moved into register with a different developing unit. The carriage is moved by an endless belt which has a pin receivable in one of two vertical slots on a plate-like female coupling member of the carriage. Guide rollers automatically disengage the pin from the coupling member when the carriage reaches the exposure station. The suction chamber is then attracted by electromagnets so that two sockets of the suction chamber move downwardly and receive stationary centering pins which hold the carrier in a predetermined position during each of a series of exposures. This insures accurage register of successively projected and developed images in the three basic colors.

7 Claims, 3 Drawing Figures

APPARATUS FOR MAKING COPIES OF MULTI-COLORED ORIGINALS

BACKGROUND OF THE INVENTION

The present invention relates to apparatus for making copies of multi-colored originals, and more particularly to improvements in electrostatic color copying apparatus. Still more particularly, the invention relates to improvements in color copying apparatus of the type wherein a sheet-like copy carrier is repeatedly moved through a single charging station and to a single exposure station and once into register with each of two or more discrete developing units.

It is known to make color reproductions of a multicolor original in an apparatus which projects several images of the original onto a copy carrier, always under the control of a different color signal, and thereupon develops each image with an appropriate developing agent for the particular color. Such apparatus exhibit several drawbacks, especially as concerns the accuracy of register or overlap of successive images of the same original. Even minor changes in position of the copy carrier during successive exposures can result in gross distortion of the color reproduction.

SUMMARY OF THE INVENTION

An object of the invention is to provide a novel and improved apparatus which can make copies of multicolored originals in such a way that each of a series of images which are projected onto a copy carrier is in register with the previously or subsequently projected image(s).

Another object of the invention is to provide novel and improved means for repeatedly centering a copy carrier at the exposure station of a color copying apparatus.

A further object of the invention is to provide novel and improved means for attaching successive copy carriers to a carriage in a color copying apparatus with a high degree of accuracy and reproducibility.

An additional object of the invention is to provide a novel and improved drive for the carriage which transports copy carriers in a color copying apparatus.

Still another object of the invention is to provide a color copying apparatus with novel and improved means for repeatedly developing a copy carrier with toner particles which are dispersed in a liquid carrier medium.

The invention is embodied in a color copying apparatus wherein the image of an original (e.g., a diapositive) is repeatedly exposed onto a sheet-like copy carrier at an exposure station (e.g., by resorting to a suitable slide projector and to a set of filters in the basic colors red, blue and green) and the copy carrier is moved to a different one of several discrete developing units subsequent to each exposure. The apparatus comprises a carriage having a suction chamber or analogous means for supporting a copy carrier thereon, guide means defining for the carriage an elongated path (preferably but not necessarily a horizontal path) extending along the exposure station and along the developing units, drive means for moving the carriage along the guide means (such drive means may include a reversible electric motor which drives an endless belt or an analogous flexible element through the medium of a gear transmission or the like), coupling means which normally connects the carriage to the drive means (such coupling means may comprise a pin or stud on the flexible element of the drive means and a plate-like extension which can constitute a component of the carriage and has two open slots spaced apart from each other and extending at right angles to the guide means), one or more guide rollers or analogous means for automatically disengaging the coupling means when the carriage reaches the exposure station, and means for centering the carriage in a predetermined position at the exposure station upon disengagement of the coupling means. The centering means insures that the copy carrier on the carriage invariably assumes the predetermined position with respect to the means for imaging an original, irrespective of the number of times the carriage is returned to the exposure station. The centering means may comprise electromagnets or the like for moving the supporting means for the copy carrier relative to the major or remaining portion of the carriage at the exposure station, female centering means on the suction chamber, and fixed male centering means extending into the female centering means when the suction chamber is moved by the electromagnet means.

The novel features which are considered as characteristic of the invention are set forth in particular in the appended claims. The improved copying apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
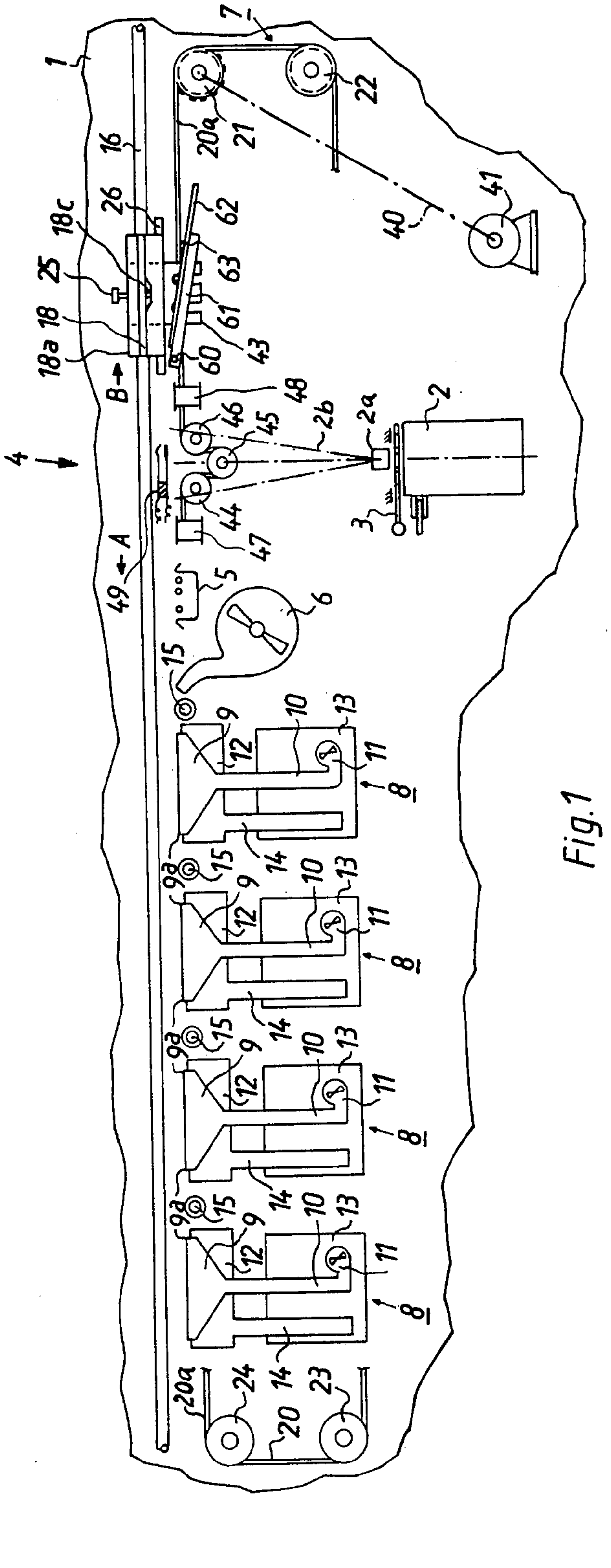
FIG. 1 is a fragmentary diagrammatic longitudinal vertical sectional view of a copying apparatus which embodies the invention, the carriage for copy carriers being shown in a starting position in which it can receive or be relieved of a copy carrier.

Referring first to FIG. 1, there is shown a portion of a color copying apparatus which comprises a housing 1 and a projector 2 mounted at an exposure station 4. The projector 2 comprises a lens 2*a* which images an original (not shown) onto a sheet-like copy carrier 29 (FIGS. 2 and 3), e.g., recording paper which is used for the making of color prints from slide transparencies or diapositives. The projector 2 further comprises or is associated with a set of filters 3 in the basic colors red, blue and green. One of these filters is moved into the path of light rays 2*b* during each of three successive exposures of a copy carrier 29.

The exposure station 4 is adjacent to a corona discharge device 5. The discharge device 5 is located between the exposure station 4 and a blower 6 which can direct one or more streams of hot air against the underside of a copy carrier 29.

The apparatus further comprises developing means which includes a battery or row of several (e.g., four) discrete developing units 8 located to the left of the blower 6, as viewed in FIG. 1. Each developing unit 8 comprises a hopper 9 which is connected to a pump 11 by a supply conduit 10. The funnel 9 is surrounded by an intercepting vessel 12 for liquid developer which is disposed at a level above a tank 13 containing a supply of developing agent. The pump 11 draws liquid from the tank 13 and forces the liquid into the funnel 9 via conduit 10. The liquid overflows the marginal portion 9a at the open upper end of the funnel 9 to enter the vessel 12 whence it returns into the tank 13 through a further conduit 14. The developing agent consists of a dielectric liquid carrier for dispersed toner particles. When a selected developing unit 8 is in use, the underside of the record carrier 29 is closely adjacent to the marginal portion 9a of the respective funnel 9. By properly correlating the quantity of liquid which is being supplied by the pump 11 and the quantity of liquid which overflows the marginal portion 9a of the funnel 9 in the respective developing unit 8, the liquid forms a film which contacts the underside of the copy carrier 29 and effects an electrophoretic development of the image in a particular basic color. Each of the four developing units 8 is adjacent to a discrete sequeegee 15 (e.g., a roller or wheel having a liquid-absorbing rim) which can be lifted (by means not specifically shown in FIG. 1) to remove surplus liquid developer from the underside of the record carrier 29 while the latter is being moved from a selected developing unit 8 back toward the exposure station 4.

Figure 2:
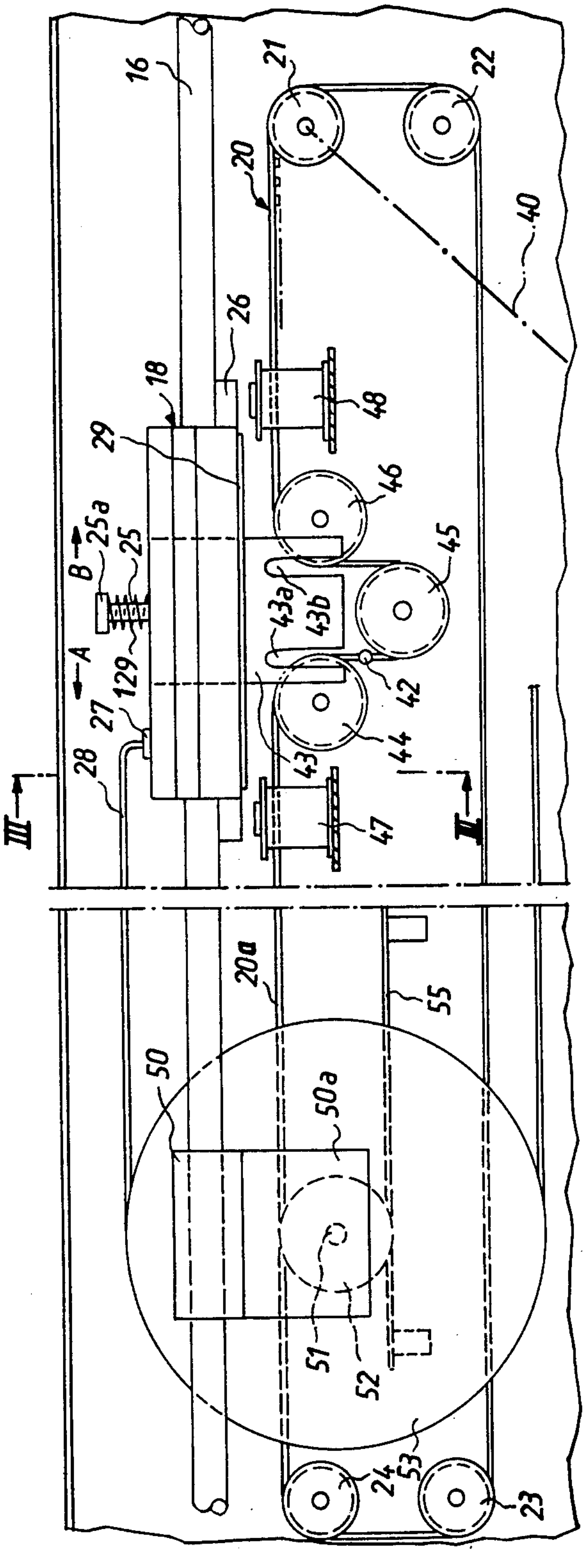
FIG. 2 is an enlarged view of a detail in FIG. 1, and further showing a trolley for a reel which pays out or collects a conduit connected to the suction chamber on the carriage.
Figure 3:
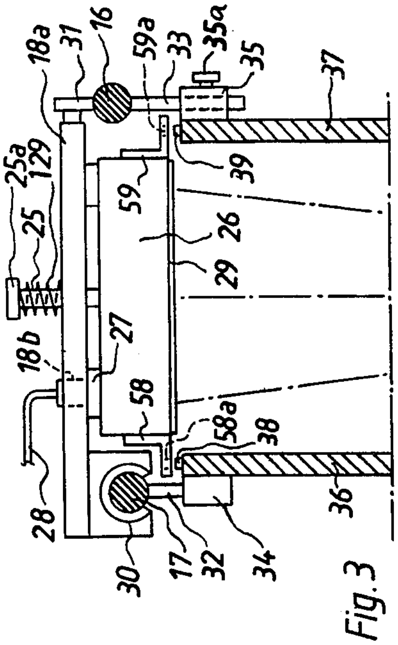
FIG. 3 is an enlarged transverse sectional view, substantially as seen in the direction of arrows from the line III—III of FIG. 2, showing the means for centering the suction chamber at the exposure station.

The means for moving the record carrier 29 between the exposure station 4 and a selected developing unit 8 comprises a carriage 18 which is reciprocable along two parallel horizontal guide rails 16, 17 (see FIGS. 2 and 3). One marginal portion of the carriage 18 has a sleeve-like follower 30 which surrounds and is movable lengthwise of the guide rail 17. The other marginal portion of the carriage 18 has one or more roller followers 31 resting on and adapted to roll along the guide rail 16. The carriage 18 is reciprocable along a straight elongated path which extends above the exposure station 4, corrona discharge device 5, blower 6 and the developing units 8. The means for supporting a copy carrier 29 at the underside of the carriage 18 comprises a box-like suction chamber 26 the bottom panel of which has perforations, not shown. The suction chamber 26 is connected with the shank of a fastener 25 (e.g., a bolt) which is reciprocable in a vertical bore provided therefor in the upper portion 18a of the carriage 18. A helical spring 129 reacts against the upper side of the upper portion 18a and bears against the head 25a of the fastener 25 to normally maintain the suction chamber 26 in the raised position shown in FIG. 2 or 3. The suction chamber 26 is electrically insulated from the remainder of the carriage 18 in order to prevent undesirable changes in electrical charge of the copy carrier 29. The suction chamber 26 has an upwardly projecting extension 27 which constitutes an air discharging nipple and is connected with one end portion of an elongated flexible conduit or hose 28 the other end portion of which is connected to a suction pump, not shown. The extension 27 slidably extends into and through a vertical bore 18b in the upper portion 18a of the carriage 18. By evacuating air from the interior of the suction chamber 26 via conduit 28, the suction pump insures that the upper side of a copy carrier 29 adheres to the underside of the perforated bottom panel of the suction chamber.

The drive means 7 for moving the carriage 18 and its supporting means or suction chamber 26 along the guide rails 16, 17 comprises an endless flexible element here shown as a toothed belt 20 which is trained over four toothed pulleys 21, 22, 23, 24. The major portion of the upper reach or stretch 20a of the belt 20 is located at a level below and is parallel with the guide rails 16, 17. The pulley 21 constitutes or is rigid with a gear which can be driven by a reversible prime mover 41 (preferably an electric motor) through the medium of a power train 40 (e.g., a train of mating gears). The belt 20 has an entraining stud or pin 42 which can engage with a plate-like downward extension 43 of the carriage 18 to move the carriage along the guide rails 16, 17. As shown in FIGS. 1 and 2, the extension 43 has two vertical open slots 43a, 43b which are normal to the elongated path of movement of the carriage 18 and one of which receives the entraining pin 42 when the carriage is coupled to the belt 20. The disengaging means for directing the pin 42 into one of the slots 43a, 43b or for causing the pin 42 to leave the slot 43a or 43b comprises three guide rollers 44, 45, 46 which are mounted at the exposure station 4 at a level below the rails 16, 17 and serve to effect suitable deflection of the upper reach 20a. The roller 45 is disposed between the rollers 44, 46 and is located without (below) the path of movement of the extension 43. The distance between the slots 43a, 43b equals or approximates the diameter of the guide roller 45. The vertical portions of the belt 20 between the rollers 44–45 and 45–46 are tangential to the roller 45. The parts 42, 43 respectively constitute the male and female members of a simple but effective automatically separable and engageable coupling between the belt 20 (i.e., the drive means 7 for the carriage 18) and the carriage. The rollers 44–46 automatically disengage the coupling 42, 43 when the carriage 18 reaches the exposure station 4.

The rails 16, 17 further support and guide a second carriage or trolley 50 having a lower portion 50a which supports a shaft 51 for a pinion or gear 52 in mesh with a stationary toothed rack 55 in the housing 1. The shaft 51 is rigid with a reel 53 whose core supports the convolutions of the conduit 28. The pinion 52 further meshes with the upper reach 20a of the toothed belt 20. When the carriage 18 moves along the rails 16, 17, its speed is twice that of the trolley 50; this insures that the conduit 28 is subjected to a constant or nearly constant tensioning force.

FIG. 3 shows that the guide rail 17 is mounted on a support 32 which is secured to a bracket 34 on an upright stationary wall 36 of the housing 1. The level of the guide rail 16 can be adjusted by a mechanism which includes a support 33 connected to and extending downwardly from the rail 16, a sleeve-like holder 35 slidably receives the lower portion of the support 33, and a screw 35a or an analogous means for releasably securing the support 33 to the holder 35 when the guide rail 16 has been located at a selected level. The holder 35 is mounted on a second stationary upright wall 37 of the housing 1. The purpose of adjustability of the guide rail 16 is to insure that the underside of a copy carrier 29 which is supported by the suction chamber 26 will be exactly parallel to the marginal portions 9a of funnels 9 in the developing units 8. This, in turn, insures a predictable development of images in the respective colors.

The means for positioning or centering the carriage 18 with respect to the projector 2 at the exposure station 4 prior to and during exposure of the copy carrier 29 to light rays **2*b* comprises a mechanism which is shown in FIG. 3. This mechanism comprises two upwardly extending centering pins or studs 38, 39 which are respectively rigid with the stationary walls 36, 37 (i.e., with the housing 1) and can enter bores or sockets 58*a*, 59*a* machined into centering brackets 58, 59 which are rigid with the suction chamber 26. The latter can be moved downwardly (against the opposition of the spring 129) by two electromagnets 47, 48 which flank the rollers 44–46 at the exposure station 4.**

The copying apparatus further comprises means for properly locating or positioning a copy carrier 29 at the underside of the suction chamber 26. As shown in FIG. 1, such locating means comprises a pressure plate 61 which is pivotally secured to the housing 1 by a hinge 60. The pressure plate 61 can be pivoted by a handle 62 and its upper side has several depressible locating protuberances 63 together forming a frame into which a copy carrier 29 can be inserted in such a way that, when properly positioned, its edge faces abut against the neighboring proturberances 63. The copy carrier 29 is placed into the space between the protuberances 63 and the pressure plate 61 is thereupon pivoted counterclockwise, as viewed in FIG. 1, so as to move the upper side of the copy carrier 29 against the underside of the foraminous bottom panel of the suction chamber 26. The pressure plate 61 is pivoted to a position in which the protuberances 63 are depressed into its body to thus insure that the copy carrier 29 comes into full surface-to-surface contact with the suction chamber 26. The pressure plate 61 is thereupon moved out of the way. The copy carrier 29 is assumed to be a paper sheet the underside of which is coated with a layer of ZnO.

The operation is as follows:

An original (e.g., a diapositive) is inserted into the projector 2 and a first filter (e.g., a blue filter) is inserted into the path of light rays **2*b* in front of the original. The carriage 18 is held in a starting position (to the right of the exposure station 4) which is shown in FIG. 1 and in which the suction chamber 26 is located directly above the pressure plate 61. A fresh copy carrier 29 is placed onto the pressure plate 61 between the protuberances 63 so that its ZnO layer faces downwardly, and the plate 61 is thereupon pivoted by way of the handle 62 in order to move the upper side of the record carrier against the underside of the bottom panel of the suction chamber 26 with simultaneous depression of protuberances 63 into the body of the pressure plate. The suction pump which is connected to the conduit 28 is on so that the chamber 26 attracts and retains the copy carrier 29. The pressure plate 61 is then moved out of the way so that the carriage 18 can be moved toward the exposure station 4.**

The operator thereupon starts the motor 41 in a forward direction by depressing a suitable starter button on a control panel (not shown). This causes the power train 40 to rotate the pulley or gear 21 so that the upper reach 20a of the belt 20 moves (at a speed *v*) in the direction indicated by arrow A. The upper reach **20*a* rotates the pinion 52 which meshes with the rack 55 so that the trolley 50** moves in the same direction (arrow A) but at the speed *v*/2. When the carriage 18 reaches the first or foremost (i.e., rightmost) developing unit 8, it is brought to a halt because a suitable trip (not shown) on the carriage opens a stationary switch (not shown) which is in circuit with the motor 41. Alternatively, the just-mentioned switch can disengage a suitable clutch (not shown) in the power train 40, between the power train 40 and pulley 21, or between the power train 40 and the output element of the motor 41. The pump 11 of the foremost developing unit 8 is then started (or is already on) to apply to the ZnO layer of the copy carrier 29 a liquid film consisting only of dielectric carrier liquid; this insures the establishment of necessary conditions for proper exposure of the copy carrier at the station 4.

The direction of operation of the motor 41 is then reversed and the aforementioned switch in the region of the reversed and the aforementioned switch in the region of the foremost developing unit 8 is closed so that the carriage 18 moves in the direction indicated by arrow B. Thus, the operative connection between the output element of the motor 41 and the pulley 21 is reestablished so that the pin 42 (which is assumed to have entered the slot **43*a* of the extension 43) can advance the carriage 18 in a direction to the right, as viewed in FIG. 1. The carriage 18 moves above the corona discharge device 5 which applies an electrostatic charge to the copy carrier 29. When the carriage 18 reaches the exposure station 4, its trip 18c actuates an electric switch 49 which disconnects the motor 41 from the pulley 21 so that the carriage comes to a halt. The stoppage of carriage 18 at the exposure station 4 is instantaneous because, at the time the trip 18*c* opens the switch 49, the entraining pin 42 moves downwardly in the slot 43*a* so that eventual further movement of the belt 20 due to inertia cannot result in any further rightward displacement of the carriage 18, suction chamber 26 and copy carrier 29 (the latter is held by suction against the underside of the bottom panel of the suction chamber 26**).

A suitable program circuit (not shown) automatically energizes the electromagnets 47, 48 when the carriage 18 comes to a standstill at the exposure station 4 whereby the energized electromagnets attract the suction chamber 26 against the opposition of the spring 129. The sockets **58*a*, 59*a* in the brackets 58, 59 of the suction chamber 26 move downwardly and automatically receive the centering pins 38, 39 of the stationary walls 36, 37 so that the carriage 18 and the suction chamber 26 are centered with respect to the projector 2 in a predetermined position in which the underside of the charged copy carrier 29 can receive a first electrostatic image from the projector (the respective light rays 2*b* pass through the first of three filters 3, e.g., through a blue filter). When the first exposure is completed, the electromagnets 47, 48 are deenergized so that the spring 129 is free to lift the suction chamber 26 and to thereby move the sockets 58*a*, 59*a* above the respective centering pins 38, 39. The direction of operation of the motor 41 is thereupon reversed and the clutch between the pulley 21 and the output element of the motor 41 is reengaged so that the upper reach 20*a* begins to advance in the direction indicated by arrow A and causes the pin 42 to reenter the slot 43*a* whereupon the carriage 18 begins to move toward the developing units 8 as soon as the pin 42 starts to move around the roller 44 (counterclockwise from the 3 o'clock toward the 12 o'clock position). The carriage 18 is arrested automatically when the copy carrier 29 is located above that developing unit 8 wherein the liquid carrier contains dispersed yellow toner particles. The first image is developed while the carriage 18 dwells above such developing unit. The motor 41 is thereupon started in reverse whereby the pin 42 enters the slot 43***a* and advances the carriage 18 in the direction indicated by arrow B. The squeegee 15 which is associated with the developing unit 8 containing yellow toner particles is raised to remove surplus liquid carrier. The carbon discharge device 5 is energized so that the copy carrier 29 is charged again before it returns to the exposure station 4.

The second exposure (e.g., with a red filter 3) takes place subsequent to renewed uncoupling of the pin 42 from the extension 43 and upon renewed energization of electromagnets 47, 48 to insure that the pins 38, 39 cooperate with the sockets 58*a*, 59*a* for the purpose of accurately centering the suction chamber 26 and copy carrier 29 in the same predetermined position in which the copy carrier was held previously during exposure with the blue filter. The exposure with a red filter is followed by movement of the carriage 18 to a developing unit 8 wherein the liquid carrier contains cyan toner. When the second image is developed, the carriage 18 is returned to the exposure station 4, the electromagnets 47, 48 are energized to center the suction chamber 26 and copy carrier 29 with respect to the projector 2 (which then contains a green filter), the electromagnets 47, 48 are deenergized upon completion of exposure with green filter, the carriage 18 is again moved away from the exposure station 4, and the carriage is brought to a halt when the copy carrier 29 is located above that developing unit 8 wherein the liquid carrier contains magenta toner particles. The thus-obtained color reproduction of a diapositive is thereupon dried by heated air issuing from the blower 6 (the carriage 18 can be arrested at the drying station) before the carriage 18 returns to the starting position of FIG. 1. The program circuit thereupon deactivates all mobile parts of the copying apparatus and the suction pump is arrested or disconnected from the conduit 28 so that the copy carrier 29 can be readily removed or stripped off the underside of the bottom panel of the suction chamber 26. The next copying operation can begin as soon as a fresh copy carrier 29 is properly attached to the suction chamber 26 with the help of the pressure plate 61. The slot 43*b* receives the pin 42 when the carriage 18 moves between the starting position of FIG. 1 and the exposure station 4.

An important advantage of the improved color copying apparatus is that, in spite of repeated coupling of the carriage 18 to and repeated disengagement of the carriage from the drive 7 including the belt 20, the copy carrier 29 invariably assumes a single predetermined position with respect to the projector 2 prior to and during each of a series of exposures with different filters. This is possible because of repeated disengagement of carriage 18 and suction chamber 26 from the belt 20; such disengagement enables the electromagnets 47, 48 to cause the centering projections 38, 39 to enter the respective sockets 58*a*, 59*a* before the projector 2 images the original onto the copy carrier. The pin 42 constitutes an extremely simple but effective entraining means which can move the carriage 18 forwardly or backwards whenever it extends into one of the slots 43*a*, 43*b* and the belt 20 is driven so as to move the pin 42 around the guide roller 44 and toward the pinion 52 (movement in a direction from the station 4 toward the corona discharge device 5) or to move the pin 42 around the guide roller 46 and away from the pinion 52 (movement in a direction from the station 4 toward the starting position of the carriage). As mentioned above, the slots 43*a*, 43*b* are normal to the path of reciprocatory movement of the carriage 18 along the guide rails 16, 17.

The improved apparatus is susceptible of many modifications without departing from the spirit of the invention. For example, the conduit 38 can be paid out or collected by a device other than that including the trolley 50 and reel 53. Also, the sockets 58*a*, 59*a* can be provided in the walls 36, 37 (or in other stationary parts of the housing 1) and the centering pins 38, 39 can be mounted on the carriage 18 or suction chamber 26. Still further, the apparatus may comprise means for adjusting the level and/or inclination of the guide rail 17 in addition to or instead of adjustment of the guide rail 16. Also, the functions of electromagnets 47, 48 and spring 129 can be reversed, i.e., the suction chamber 26 can be urged downwardly by one or more springs or by other suitable biasing means and pulled upwardly by one or more electromagnets which are energized whenever the suction chamber 26 is to be held in the raised position. Still further, the suction pump can be mounted directly on the carriage 18 so that the trolley 50, reel 53 and conduit 28 can be dispensed with.

Without further analysis, the foregoing will so fully reveal the gist of the present invention that others can, by applying current knowledge, readily adapt itfor various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a color copying apparatus wherein the image of an original is repeatedly exposed onto a sheet-like copy carrier at an exposure station and the copy carrier is moved to a different one of several developing units subsequent to each exposure, a combination comprising a carriage having means for supporting a copy carrier thereon; guide means defining for said carriage an elongated path extending along said exposure station and said developing units; drive means for said carriage, including an endless flexible element and means for moving said flexible element along a fixed path; coupling means normally connecting said carriage to said drive means and comprising a first coupling member in form of a pin on said flexible element and a complementary second coupling member on said carriage and having two spaced-apart parallel open slots normal to said elongated path; a roller adjacent to the path of movement of said second coupling member with said carrier for guiding a portion of said flexible element in parallelism with said slot, said roller having a diameter at least substantially equal to the distance between said slots; means for automatically disengaging said coupling means when the carriage reaches said exposure station, comprising a device which defines for said first coupling member at least one further path which is normal to said elongated path so that said carriage is at a standstill while said first coupling member is located in said further path; and means for centering said carriage in a predetermined position at said exposure station upon disengagement of said coupling means.

2. A combination as defined in claim 1, wherein said exposure station and said developing units are located at one side of said path, and further comprising means for electrically charging the copy carrier on said supporting means intermediate said exposure station and said developing units.

3. A combination as defined in claim 1, wherein said device further comprises two additional rollers flanking said first-mentioned roller, said flexible element being trained over said rollers so that it comprises two portions which are tangential to said first-mentioned roller and parallel to said slots.

4. A combination as defined in claim 1, wherein said carriage comprises a first portion, a second portion which constitutes said supporting means and includes a suction chamber arranged to attract a sheet-like copy carrier, means mounting said suction chamber for movement at right angles to said elongated path, and means for biasing said suction chamber to a first position, said centering means comprising at least one first centering member on said suction chamber, at least one stationary second centering member at said exposure station, and means for moving said suction chamber to a second position against the opposition of said biasing means to thereby engage said first centering member with said second centering member.

5. A combination as defined in claim 4, wherein said first centering member has a socket and said second centering member is a stud which enters said socket when said suction chamber is moved against the opposition of said biasing means.

6. A combination as defined in claim 4, wherein said means for moving said suction chamber to said second position comprises at least one electromagnet.

7. A combination as defined in claim 1, wherein said elongated path is a horizontal path and said guide means comprises two parallel guide rails, and further comprising means for adjusting the level of one of said rails, said exposure station and said developing units being disposed below said rails.

* * * * *